(12) United States Patent
Mizrah

(10) Patent No.: US 7,073,067 B2
(45) Date of Patent: Jul. 4, 2006

(54) AUTHENTICATION SYSTEM AND METHOD BASED UPON RANDOM PARTIAL DIGITIZED PATH RECOGNITION

(75) Inventor: Len L. Mizrah, San Carlos, CA (US)

(73) Assignee: Authernative, Inc., Walnut Creek, CA (US)

( * ) Notice: Subject to any disclaimer, the term of this patent is extended or adjusted under 35 U.S.C. 154(b) by 530 days.

(21) Appl. No.: 10/431,412

(22) Filed: May 7, 2003

(65) Prior Publication Data

US 2004/0225899 A1 Nov. 11, 2004

(51) Int. Cl.
*H04K 1/00* (2006.01)

(52) U.S. Cl. .............. 713/183; 713/184; 713/185; 713/161

(58) Field of Classification Search ........ 713/183–185, 713/161
See application file for complete search history.

(56) References Cited

U.S. PATENT DOCUMENTS

| | | | |
|---|---|---|---|
| 5,276,314 A | 1/1994 | Martino et al. | |
| 5,428,084 A | 6/1995 | Swarup et al. | |
| 5,465,084 A | 11/1995 | Cottrell | |
| 5,559,961 A | 9/1996 | Blonder | |
| 5,608,387 A | 3/1997 | Davies | |
| 5,664,099 A | 9/1997 | Ozzie et al. | |
| 5,956,699 A | 9/1999 | Wong et al. | |
| 6,085,320 A | 7/2000 | Kaliski, Jr. | |
| 6,092,202 A | 7/2000 | Veil et al. | |
| 6,098,053 A | 8/2000 | Slater | |
| 6,189,098 B1 | 2/2001 | Kaliski, Jr. | |
| 6,209,104 B1 * | 3/2001 | Jalili | 726/18 |
| 6,332,192 B1 | 12/2001 | Boroditsky et al. | |
| 6,367,015 B1 * | 4/2002 | Kubo et al. | 713/183 |
| 6,934,860 B1 * | 8/2005 | Goldstein | 713/183 |
| 7,007,168 B1 * | 2/2006 | Kubo et al. | 713/183 |
| 2001/0039618 A1 | 11/2001 | Azuma | |
| 2002/0029341 A1 | 3/2002 | Juels et al. | |
| 2002/0053035 A1 | 5/2002 | Schutzer | |
| 2002/0152180 A1 | 10/2002 | Turgeon | |

FOREIGN PATENT DOCUMENTS

| | | | |
|---|---|---|---|
| GB | 2313460 | * | 11/1997 |
| WO | WO 2004081767 | * | 9/2004 |

OTHER PUBLICATIONS

Bolande, H. Asher, "Forget passwords, what about pictures?" WSJ Interactive Edition, Nov. 27, 2000.

(Continued)

*Primary Examiner*—Jacques H. Louis-Jacques
*Assistant Examiner*—Tongoc Tran
(74) *Attorney, Agent, or Firm*—Haynes Beffel & Wolfeld; Mark Haynes

(57) ABSTRACT

An authentication server provides a clue to a client indicating a random partial subset of a full pattern that characterizes a full digitized path on a frame of reference, and the client enters a data to fulfill an authentication factor suggested by the clue. The full pattern consists of an ordered set of data fields, which store parameters that specify the full digitized path on a reference grid for recognition. The server presents an instance of a graphical representation of the frame of reference, including an array of random indicators at data field coordinates in the frame of reference. The server accepts indicators from the array of indicators corresponding to coordinates along said digitized path identified by the random partial subset as input data to fulfill the authentication factor.

39 Claims, 6 Drawing Sheets

OTHER PUBLICATIONS

Dhamija, Rachna, et al., "Déjà vu: A User Study Using Images for Authentication," SIMS/CS, University of California Berkeley, http://paris.cs.berkeley.edu/%7Eperrig/projects/usenix2000/usenix.pdf.

Haubert, William H. III, "An Interactive Approach to Secure and Memorable Passwords," A Thesis in TCC 402 presented to the Faculty of School of Engineering and Applied Science, Unversity of Virginia, Mar. 25, 2002, 1-22.

Lee, Jennifer 8, "And the Password is . . . Waterloo," New York Times, Dec. 27, 2001, 6 pages.

Perrig, Adrian, et al., "Hash Visualization: a New Technique to improve Real-World Security," Computer Science Department, Carnegie Mellon University, 1-8, http://paris.cs.berkeley.edu/%7Eperrig/projects/validation/validation.pdf.

"The Science Behind Passfaces", Sep. 2001, Real User Corporation, http://www.realuser.com/published/ScienceBehindPassfaces.pdf.

Reynolds, Martin, "Microsoft TechFest Signposts Software Futures," Gartner Dataquest Perspective, Gartner, Inc., 2002.

Jermyn, Ian, et al., "The Design and Analysis of Graphical Passwords," Proceedings of the 8th USENIX Security Symposium, Washington, D.C. Aug. 23-26, 1999, 15 pages.

Lemos, Robert, "Passwords: The weakest Link?" CNET News.com, May 22, 2002, http://news/com.com/2009-1001-916719.html.

McCurley, Kevin S., "Protecting Privacy and Information Integrity of Computerized Medical Information," Sandia National Laboratories, Mar. 11, 1996, http://www.swcp.com/~mccurley/cs.sandia.gov/health/health.html.

* cited by examiner

FIG. 3A
FIG. 3B
FIG. 3C
FIG. 3D
FIG. 3E
FIG. 3F

AUTHENTICATION SYSTEM AND METHOD BASED UPON RANDOM PARTIAL DIGITIZED PATH RECOGNITION

RELATED APPLICATION DATA

The present application is related to my prior U.S. patent application Ser. No. 10/328,640, filed 23 Dec. 2002, entitled "Authentication System and Method Based upon Random Partial Pattern Recognition"; U.S. patent application Ser. No. 10/353,500; filed 29 Jan. 2003, entitled "System and Method for User Authentication Interface"; and U.S. patent application Ser. No. 10/378,226 filed 3 Mar. 2003, entitled "Operation Modes for User Authentication System Based on Random Partial Pattern Recognition". The present application is also related to my U.S. patent application Ser. No. 10/431,396 filed on 7, May 2003, filed on the same day as the present application, entitled "Strong Authentication Systems Built on Combinations of "What User Knows" Authentication Factors," which is incorporated by reference as if fully set forth herein.

BACKGROUND OF THE INVENTION

1. Field of the Invention

The invention relates generally to user authentication systems, used for computer and network security access control systems; and more particularly to improved "what user knows"-based authentication factors, in client/server network architectures and other architectures.

2. Description of Related Art

The most widely used user authentication method is referred to herein as the Standard Static Password Recognition (SSPR) algorithm. The SSPR algorithm simply requires a user to enter a user name and a password for authentication. This is a "what user knows" type authentication factor. Other types of authentication factors are not as widely deployed, and include "what user has" (card key), and "what user is" (fingerprint). "What user has" and "what user is" type authentication factors require special hardware devices, such as card readers, tokens, fingerprint sensors and the like at the input terminals, and therefore are typically much more expensive and impractical than a "what user knows" type. "What user knows" type authentication factors are limited by the ability of a person to remember the factor involved. For example, typical users select passwords for SSPR within a "comfort level" of complexity for memorization, usually in the range from one to seven (or eight) alphanumeric characters long. Often, the password is a simple word or an integer number (like, "patriot", "London", 11223344, etc.). Technological progress and demands of contemporary industrial society security lead to at least two serious issues related to the safety of typical passwords in SSPR, including:

1. An intruder may employ a brute-force technique, known as a dictionary attack, of successively trying all the words in an exhaustive list against a password file. Each consecutive tried word gets encrypted using the same algorithm that the login program under attack is using. Dictionary attacks, applied either to hashed passwords, intercepted on communication lines, or directly at the password entry devices, allow for quite easy password re-engineering.
2. Another issue is related to password combinatorial capacities of typical passwords that are within a "comfort level" of complexity for most users. For larger organizations, a range of passwords within such comfort level may not be sufficient.

Typical enterprise level solutions (enterprise-wide IT department policies) in accounting for items 1 and 2 above, require users to have at least 4–5 (or more) alphanumeric case sensitive character passwords, which should not to be simple words (but rather something, like: 1patRIOT, Lon7Don, etc.). This approach leads to multiple password resets by users that forget or lose their passwords, which resets have become quite costly and annoying hurdles for organizations and enterprises (or service companies) striving for higher security levels.

Objective consideration shows that the minimum number of characters in a password is limited at a minimum by two factors: necessary combinatorial capacities and high susceptibility to combinatorial attacks. The maximum number of characters in static passwords is limited by users' "comfort level" for memorization. Eventually, one ends up with 4–8 alphanumeric characters range (no character case sensitivity), or 3–7 alphanumeric characters (having character case sensitivity). Until recently, organizations and enterprises (or service companies) have tolerated these well known deficiencies due to relative simplicity, low cost, and wide spread adoption of SSPR user authentication technology.

Meanwhile, emerging requirements are forcing the security industry (Authentication-Authorization-Accounting (AAA or 3A) programs, Encryption, Enterprise Software, Financial Service Providers, etc.) to re-consider SSPR based user authentication technology:

1. The first issue is progress in ASIC chip data-processing power, which makes combinatorial attacks in breaking static passwords much more efficient. The apparent line of defense would be increasing static password lengths. Unfortunately, as we already discussed, this capability is already quite limited by users' "comfort level". So, SSPR based security systems appeared to be in between a rock and a hard place, as the minimum password length (3–4 alphanumeric characters) must be increased to sustain more and more efficient combinatorial attacks, whereas the entire static password length has to be remained unchanged and limited to 6–7 alphanumeric characters range due to human being memory limitations.
2. Also, a number of security problems arising in large scale systems, like deficiencies in state/country voting systems, credit card fraud, privacy and security breaches at health data banks and at financial service organizations, Microsoft 2000 and XP operating systems' vulnerabilities, etc., have led to the necessity to improve or re-build large scale security systems. Evolution of these systems will eventually require much higher static password combinatorial capacity, than may be required at an organization/enterprise level. Assuming, about 10 million users at a state level and about 100 million users nation wide, passwords having at least 5 characters are needed for a state-wide system, and passwords having at least 6 characters are needed for country wide password based security systems (assuming no character case sensitivity, or 4 and 5 characters respectively for a character sensitive case). As processing power in the hands of hacker increases, the minimum password size for a secure system approaches or exceeds the "comfort level".
3. Once national security systems, databases and various markets get integrated internationally (say US and EU), the number of users requiring unique passwords increases to the point that the combinatorial capacity of such systems would require at least 6 alphanumeric characters (case sensitive passwords), or 7 for systems without character case sensitivity. This is already at the boundary of users' "comfort level".

Accordingly, SSPR is reaching the limits of its practical application for large-scale static password based security systems. That accounts for serious attention recently given to alternative high security user authentication methods, like biometrics, tokens, and smart cards. Of these techniques, biometrics is the only true user authentication method. The other ones can be a part of user authentication systems, but are insufficient by themselves.

Unfortunately, biometrics is great deal more expensive and difficult to deploy, than SSPR based systems. There is, also, a significant public reluctance against biometric authentication methods due to religious and cultural concerns. Another strong concern, if using biometrics, is private biometrics data safety. Once stolen, the biometric data can be re-used forever to impersonate the individual that the data is taken from.

B. Attacks Against SSPR Based Systems

Besides several issues listed above, static password technology is particularly vulnerable to a number of attacks, and defenses against such attacks have limited scope. Some of the possible attacks and defenses to the attacks, include the following:

1. Password Guessing

An intruder tries to log in with a real user name while making password guesses based on the user personal knowledge.

Defense-automatic session lock out after several failed attempts; possible account revoke or a forced password reset 2. Log-In Session Videotaping Widely available micro audio and visual sensors, and other tools, facilitate hidden observations. Video- and/or audio-recording is possible from a significant distance and any time of the day, jeopardizing secret passwords or PINs entered by computer or network online users at public locations (ATM machines; customers at Point-of-Sales; Internet terminals offered at various conferences, cafes, libraries; employees sharing large offices with desktop computer terminals within everybody's visual reach, and other places).

Defense-no standard protection technology except being vigilant.

3. Shoulder Surfing

An intruder nearby the legitimate user watches password entering.

Defense-no standard protection technology except displaying echo dummy characters and different number of them.

4. Social Engineering

An intruder pretends to be an administrator or a real user asking for a password disclosure/reset.

Defense-non disclosure/reset policy.

5. Trojan Horse

Hidden downloaded software looking like a standard login session but collecting instead user names and passwords.

Defense-some protection is possible for vigilant users and administrators with antivirus protection and intrusion detection software.

6. Keystroke Monitoring

Secretly downloaded software keeping a log of all keystrokes

Defense-employees are defenseless, if the employer is the attack originator; legal protection is a possible alternative.

7. Con Artists

Can figure out the password while being quite far from the real user and having special hearing/observation skills/training.

Defense-no standard protection technology except being vigilant.

8. Network Sniffing

An intruder records user names and passwords while in transit on communication lines.

Defense-encryption protocols: Kerberos, SSL, IPsec; challenge response, one time passwords with tokens or smart cards; biometrics instead of passwords.

9. Keyboard Buffer Memory Sniffing

Some desktop operating systems do not have hardware protection against intruders' software copying passwords from a keyboard buffer.

Defense-no standard protection except making hardware protection at a microprocessor level.

10. Password File Theft

Every user name has a password entry in a hashed form which can be read.

Defense-Needham-Guy algorithm is used: each password is an encryption key for itself to be hash encrypted.

All attacks above can be separated out into three different categories: communication line attacks (8, dictionary attack), attacks at input/output devices (1, 2, 3, 4, 5, 6, 7, 9), and database attacks (10).

C. Enhanced Security Requirements

As manifested by the list of attacks above, SSPR security technology is vulnerable to well known security breaches. SSPR is based on "what user knows", as opposed to other authentication factors based on "what user has" (for instance, hardware tokens), or "what user is" (such as biometric traits, like, fingerprints, face, eye, and voice recognition). It is well known, "what user knows"-based authentication systems are the most attractive due to being cheap, user friendly, easily electronically deployable, and requiring no additional hardware, as opposed to other authentication factors. That is why numerous attempts have been made to improve SSPR technology and satisfy the requirements of the Internet mass transaction and e-commerce community. Several enhanced user authentication security requirements include the following:

1. Even without encryption, authentication secrets (like passwords or PINs) shared between a client and a server should not be revealed, if the data are intercepted by an intruder, while in transit on communication lines.

2. Authentication system is to demonstrate strong resilience against attacks at input/output devices (see, for example, B1–B7, B9).

3. "What user knows"-based authentication system should use secret knowledge shared with a server, which is easier than, or of comparable difficulty for a human being to remember as compared to static passwords. Otherwise, the system does not have a chance to be widely adopted.

4. Client and server have to perform mutual authentication to each other.
5. Client should be able to get authenticated to by server and get access to protected resources from any computer platform on the Internet.
6. Authentication system should have zero footprint downloaded software on the client computer platform.
7. No additional hardware as compared to SSPR technology.
8. Easy and cheap match to any other authentication factor in building "strong authentication" security systems (having two or more authentication factors).
9. Compatible with security of message-oriented Web Services technologies (like SOAP, SAML, XML, WSDL, etc.).

Representative prior art authentication technologies are described in Juels, US 2002/0029341; Boroditsky, U.S. Pat. No. 6,327,659; Boroditsky, U.S. Pat. No. 6,332,192; Azuma, US 2001/0039618; Jalili, U.S. Pat. No. 6,209,104; Ozzie, U.S. Pat. No. 5,664,099; Davies, U.S. Pat. No. 5,608,387; Blonder, U.S. Pat. No. 5,559,961; Baker, U.S. Pat. No. 5,428,084; Cottrell, U.S. Pat. No. 5,465,084; and Martino U.S. Pat. No 5,276,314.

Many approaches promise certain improvements toward meeting some of the requirements (1–9) listed above. However, no known approach (except SSPR) has experienced wide public and industry acceptance. Further, none allow for a comprehensively secure system and method of user authentication, covering the entire list of requirements listed above. Thus, what is needed is an authentication system and method allowing for highly elevated practical security against most of known attacks on communication lines and at data entry devices while assuring sufficient enough combinatorial capacity. In addition, user interfaces for such new authentication systems which contribute to ease of use and security are required.

SUMMARY OF THE INVENTION

The present invention provides a new Random Partial Digitized Path Recognition (RPDPR) algorithm, and authentication systems and methods founded on the algorithm. RPDPR authentication technology has the positive features of SSPR based security systems, but at the same time, is much stronger in terms of security. RPDPR technology is extremely effective against computer data processing dictionary or brute force attacks, password guessing, password file theft, shoulder surfing, eavesdropping, videotaping, Trojan Horse attack, memory sniffing attacks, keystroke monitoring, and network sniffing. At the same time, RPDPR provides a "what user knows" authentication method with enormous combinatorial capacity, while remaining within a user's "comfort level" for memorization.

The present invention is embodied by an interactive method for authentication of a client. The method is interactive in the sense that the server provides a clue to the client that has already been identified by the server, and the client enters a data suggested by the clue. Embodiments of the method utilize a full pattern that consists of a set of data fields, which store parameters that specify a digitized path on a reference grid for recognition. Further, embodiments of the method utilize a random partial subset of the full pattern stored in the server, for fulfillment of the authentication factor.

According to embodiments of the method, an ordered set of data fields is stored in secure memory. The data fields in the ordered set include respective field contents, which store coordinates of points on a digitized path on a frame of reference. A position of a data field in the ordered set, and the contents of the data field, specify a point on the digitized path. The server provides to the client via a communication medium a clue, such as positions in the ordered set of a random subset of data fields from the ordered set, which identify a random partial pattern form the full pattern stored in the ordered set of data fields. For the purpose of clarity, the term "random" as used herein is meant to include pseudo-random.

The server presents an input construct, as part of a graphical user interface for example which displays the clue. Input construct facilitates input of data corresponding to the field contents of the positions indicated by the clue. For example, the input construct in one embodiment includes an instance of a representation of the frame of reference, such as a rectangular grid. The instance of the representation of the frame of reference includes a randomized array of indicators occupying positions having coordinates in the frame of reference, that correspond with coordinates stored in the set of data fields that specify a digitized path. In some embodiments, the indicators displayed in the instance of the frame of reference displayed during an authentication session include one or more of alphanumeric characters, images and colors.

The input construct includes input fields for inserting indicators from the randomized array of indicators. The client satisfies the authentication factor by inserting indicators from the instance of the frame of reference, taken from the coordinates identified by the field contents of data fields in the data set specifying the digitized path and having the positions along the digitized path specified by the clue. The server generates different instances of the frame of reference, in which the randomized array of indicators is changed for each random combination of data field positions on the full digitized path and for different authentication sessions. Thus, a particular indicator corresponds to the field contents that identify particular combination of coordinates, only during a single authentication session. The server verifies the indicators, with reference to the clue, the stored full pattern and the instance of the frame of reference provided for the particular authentication session. If the input data matches, successful authentication is signaled. Else, a failed authentication is signaled.

In some embodiments of the invention, the process involves presenting to the client an input construct for account set up. The input construct may comprise a graphical user interface presented using an Internet browser or a thin client software. A user provides field contents for an ordered set of data fields specifying a digitized path on a frame of reference.

Embodiments of the invention include an initial step of detecting an attempted access to protected resources in the data network. In response to detection of the attempted access, the authentication procedure is initiated. After successfully completing the authentication procedure, authentication of the client is signaled, allowing access to a protected resource.

Further embodiments of the invention display an icon during at least one of the first and second prompting and verifying steps. The icon has a first state during the prompting, a second state while waiting for verification, and a third state after verification. For example, in one embodiment the icon comprises a stoplight icon which displays a red light during said prompting, a yellow light while waiting for verification, and a green light after verification.

Embodiments of the invention include a system for authentication of a client. The system includes a data processor including an interface to a database, an interface to a data network, and authentication system programs executable by the data processor. The system programs include authentication logic supporting the RPDPR authentication factor for authentication of a client based upon client credentials including an account user name.

The invention is also embodied by authentication systems based on the client/server architecture, and other architectures. In one embodiment, the process is extended to an authentication server for a large number of users. In this embodiment, the process involves maintaining a secure database of user accounts, including data sets of data fields as described above. In this system, attempts to access a protected network resource are detected or otherwise redirected to the server. The server then conducts an authentication session as described above to enable a client to have access to the protected resource.

Systems embodying the present invention include data processing resources including a processor, memory and network interfaces. Authentication server software being executed in the data processing resources carry out the processes for account set up and client authentication, as described above.

RPDPR based authentication technology is as user friendly, as cost effective and as electronically deployable as Standard Static Password Technology (SSPR). At the same time, security is much higher using RPDPR based authentication, as compared to SSPR. It allows for effective protection from multiple intruding attacks at data entry devices as well as on communication lines, while data are in transit. RPDPR based authentication technology is applicable to hardware and human clients, while having scalable security allowing for trade offs involving cost, business requirements, and hardware resources.

Other aspects and advantages of the present invention can be seen on review of the drawings, the detailed description and the claims, which follow.

BRIEF DESCRIPTION OF THE DRAWINGS

FIGS. 3A–3F provide a secret full digitized path selection menu and various examples of full continuous paths having ten positions for online user account set up in support of the RPDPR authentication process during the login sessions according to the present invention.

DETAILED DESCRIPTION

A detailed description of embodiments of the present invention is provided with reference to FIGS. 1 through 6.

Figure 1:
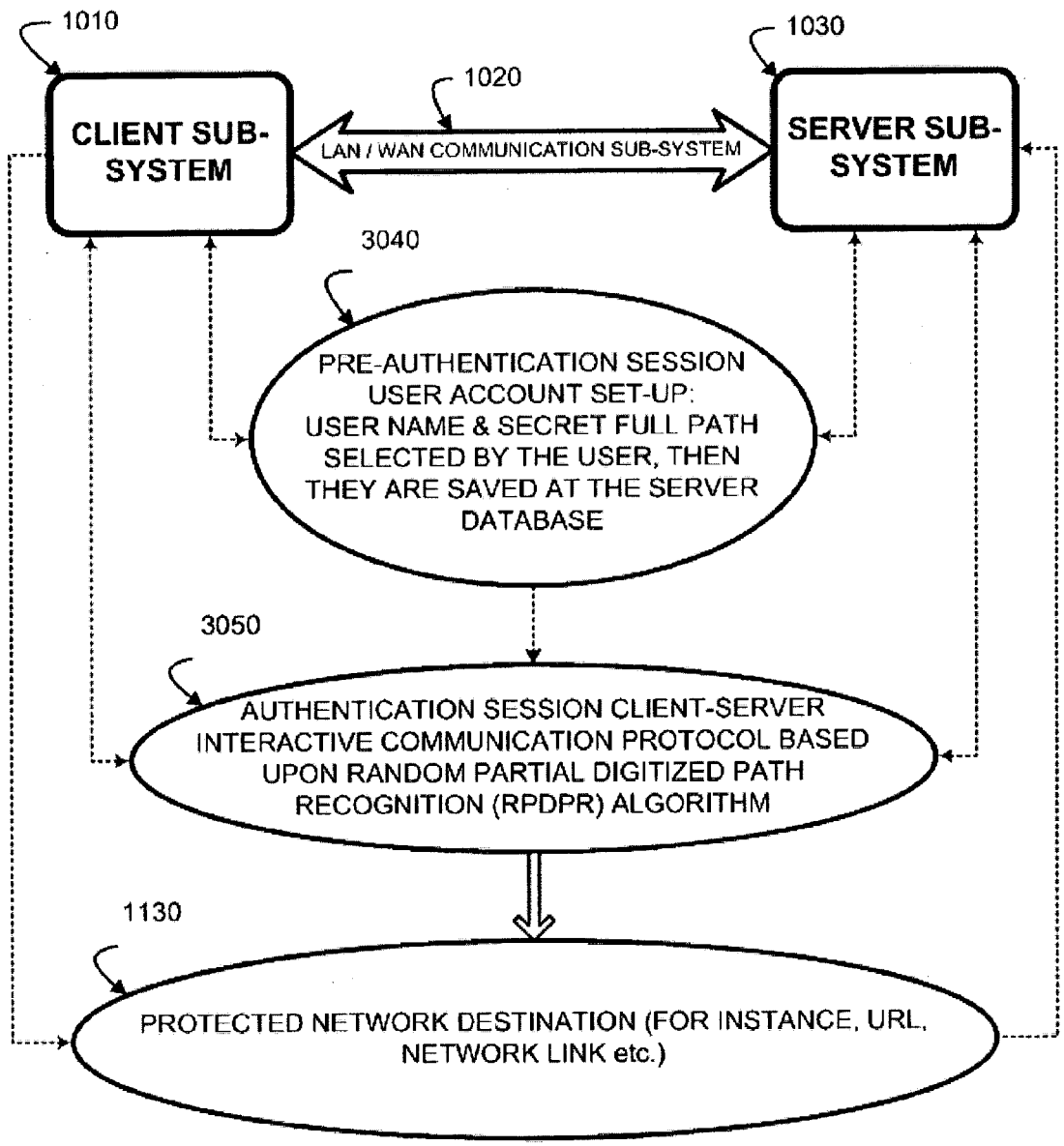
FIG. 1 illustrates client/server architecture for implementation of a user authentication process based on a random partial digitized path recognition RPDPR algorithm according to the present invention.
Figure 2:
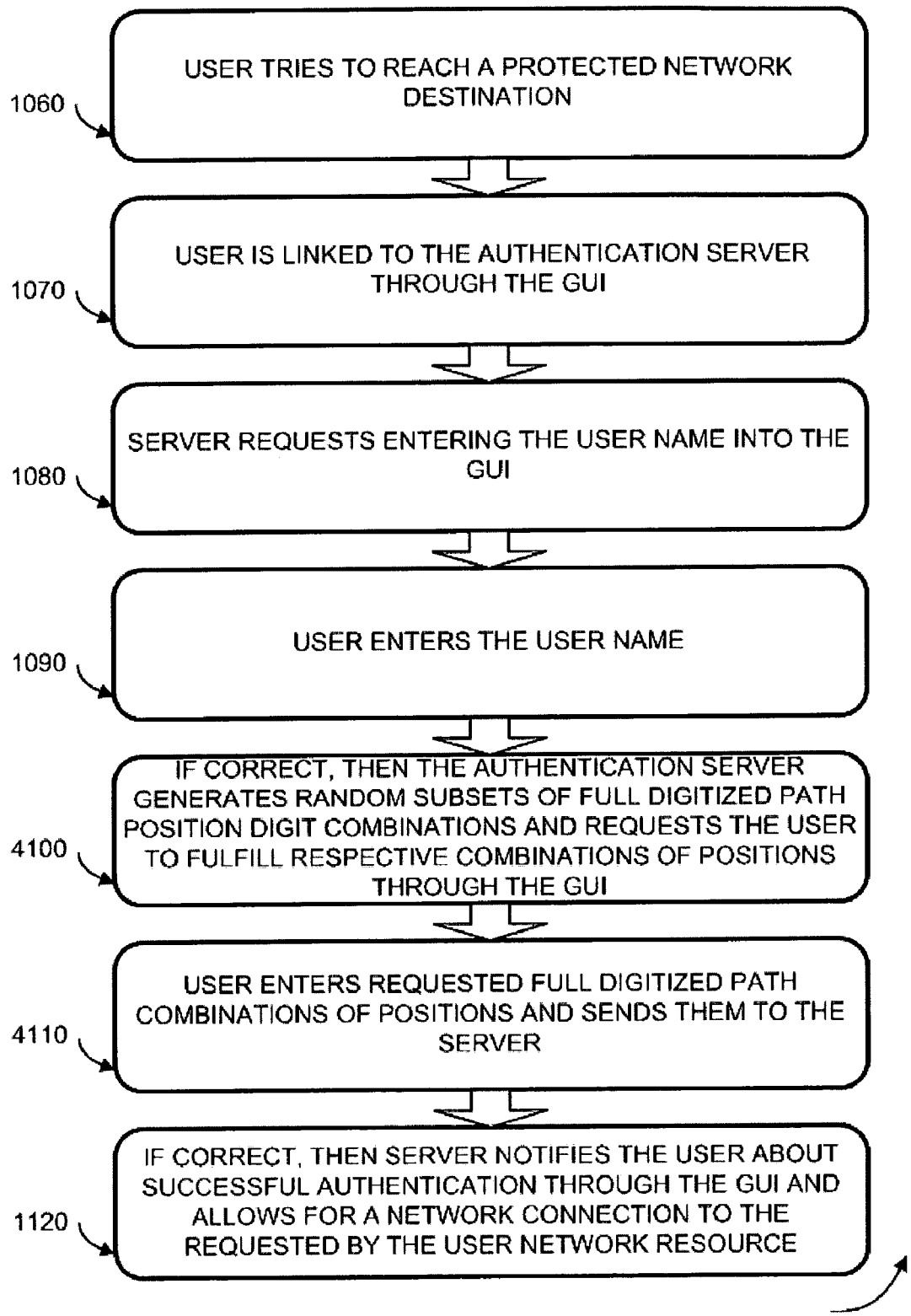
FIG. 2 is a flowchart of a basic random partial digitized path recognition RPDPR authentication session according to the present invention.

FIG. 1 illustrates a basic communication set up for a representative RPDPR authentication process, according to the present invention. A client subsystem 1010 communicates by communication media, such as a local area network or wide area network communications subsystem 1020, with a server subsystem 1030. A protected network destination 1130 controls access to resources such as secure web sites identified by URLs, links to secure networks, and the like.

To set up access, a pre-authentication session 3040 is executed by the client subsystem 1010 and server subsystem 1030. In the pre-authentication session 3040, a user account is set up in the server subsystem 1030, the user name and a secret digitized path represented by an ordered data set of data fields is selected by the user and stored in the server subsystem 1030. The ordered data set characterized the user's full pattern, in which the data fields have a position in the data set and have respective field contents. For RPDPR, the field contents include combinations of field coordinates on a frame of reference of points. The coordinates characterize data field locations along a directed digitized path on the frame of reference. The position in the data set corresponds to the position (e.g. field number) of a corresponding point on the directed digitized path, which has coordinates known to the client on the frame of reference. The position in the data set therefore indicates such coordinates to the client, and the coordinates can be used to select an indicator to be supplied as fulfillment of a part of the authentication factor that corresponds to the position indicated by the clue.

The user account information, user name and ordered set of data fields are stored in a secure server database, along with such other information utilized during an authentication session. In some embodiments, information supporting additional authentication factors is stored in the database.

To gain access to the protected network destination 1130, the client subsystem 1010 and server subsystem 1030 execute an authentication session 3050 that includes a client/server interactive communication protocol based on RPDPR. A more detailed description of an embodiment of an authentication session 3050 is provided with reference to FIG. 2.

According to one basic flow, an authentication session is initiated when the user tries to reach a protected network destination (block 1060). The protected network destination redirects the user's attempted access to the authentication server, or the attempted access is otherwise detected at the authentication server 1030. In one example, where the user is attempting access using an Internet browser, a communication interface is returned to the user's browser including a graphical user interface including links to the authentication server 1030 (block 1070). The communication interface may be returned through redirection for example, by the authentication server or another network resource. Via the communication interface, the server prompts the user to enter a user name into a field in the graphical user interface (block 1080). The user enters the user name, which is returned to the authentication server (block 1090). If the user name is valid, then the authentication server identifies a random partial subset of data fields from the ordered data set, the field contents and field positions together indicate coordinates of a set of points that together define a full digitized path on the frame of reference. For instance, in one embodiment there are ten data fields comprising a full digitized path with the starting path field having position 0, next consecutive data field having position 1, and going alike up to the last data field at the full digitized path end having position 9. Then, random partial subsets identified by the authentication server (a clue) and presented to the user through the graphical user interface will look like a random set of random digit combinations, for example, 24, 019, 7, 68. The user is prompted to fulfill input field values that correspond to the coordinates in member data fields in the random partial subset of data fields using the graphical user interface (block 4100). In one example, the input field values are selected from an array of indicators located on an instance of the frame of reference, where the indicators in the array have locations on the instance of the frame of reference corresponding to candidate coordinates in the frame of reference. The user inputs the indicators, or other data corresponding to the coordinates for the random partial subset of the digitized path, for the input field contents, and the input data are returned to the server (block 4110). If the input data matches the field contents for the random subset, then successful authentication is signaled to the user via for example the graphical user interface, signaled to the protected network destination and/or signaled to other resources, such as authorization and accounting systems, that need to know that the authentication session has succeeded, and network connection to the requested protected network destination is allowed (block 1120).

Figures 3A, 3B, 3C, 3D, 3E, 3F:
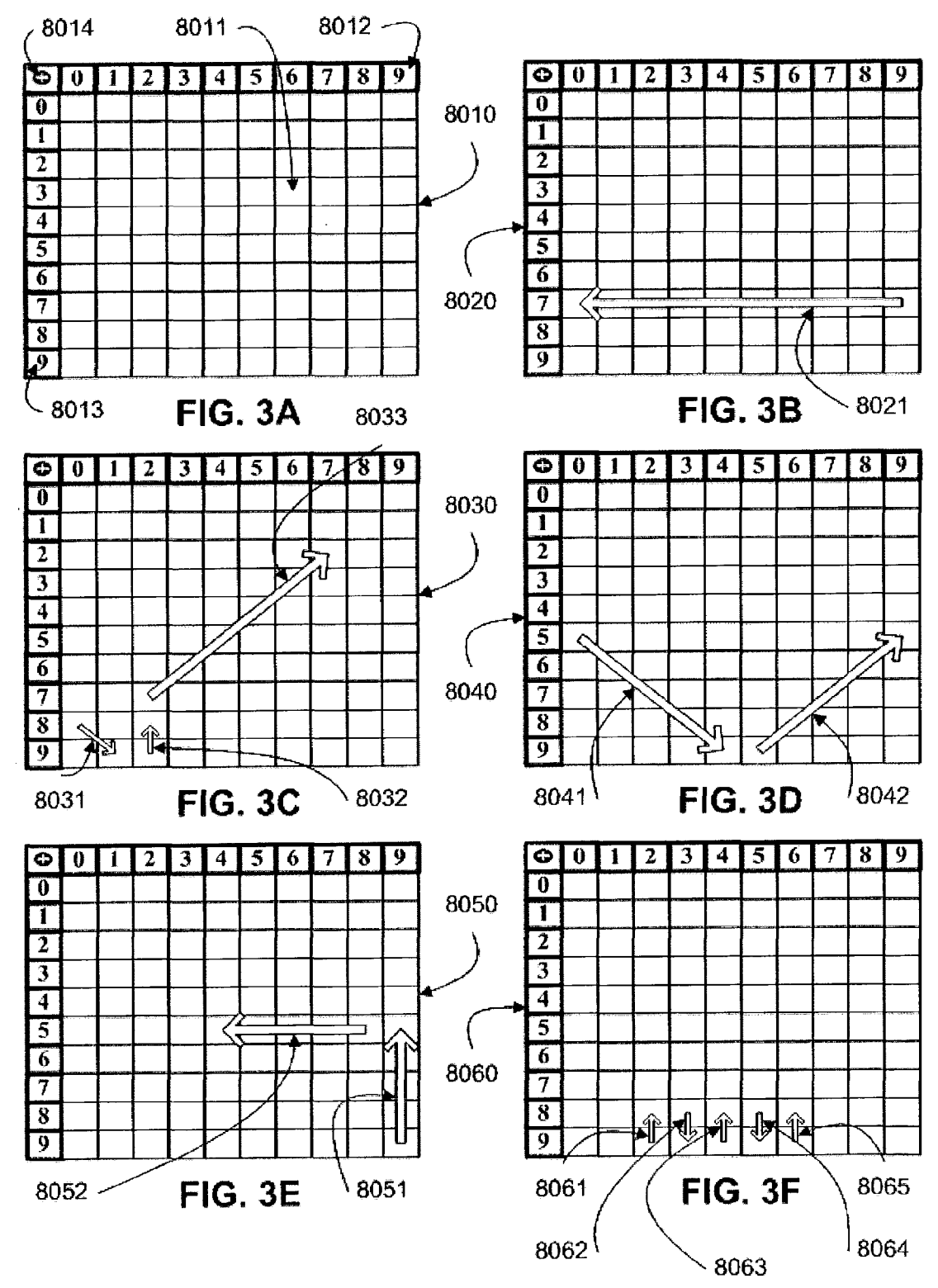

FIGS. 3A–3F and 4A–4F illustrate how a digitized path is specified with respect to a frame of reference for use as a RPDPR authentication factor. In this example, the frame of reference consists of a reference grid as shown in FIG. 3A. The reference grid 8010 in this embodiment consists of an array of locations (e.g. 8011) that can be characterized by coordinates along horizontal and vertical axes 8012, 8013 respectively, as in a Cartesian coordinates system. Other frames of reference may be organized according to other coordinate systems, such as polar coordinate systems. In the example shown in FIG. 3A the location 8011 can be characterized by coordinates (6, 3). FIG. 3A represents an instance of a frame of reference for display on a user interface during an account setup procedure for example, used by a client to specify a full digitized path. Thus, the instance includes icon 8014 at the intersection of the reference axes, used as a button for opening and closing the instance. The client may draw (or choose, or select) a path on the reference grid with a mouse, a keyboard, or other input devices, or the path may be provided by a server, as suits a particular instance of the set up algorithm.

FIGS. 3B–3F illustrate representative full digitized paths which can be set up using the frame of reference 8010. Thus, FIG. 3B illustrates a path 8021 on an instance 8020 of the reference grid. The path includes a set of points beginning with a point at coordinates (9, 7). The path proceeds in a straight line in order with points at the coordinates (8, 7), (7, 7), (6, 7), . . . , (0, 7). A data set corresponding with this digitized path comprises a set a data fields having positions 0 through 9 in the data set (where the positions can be represented by a field number using a data set that comprises a linear array of data fields). The data fields at the 10 positions respectively store combinations of coordinates (9, 7) through (0, 7) in order. In this manner, if the client knows the path and the location of data fields in the data set, the client can determine the coordinates stored in the data field. Those coordinates can be used to fulfill the authentication factor as described below.

FIG. 3C illustrates a path represented by arrows 8031, 8032, 8033 on an instance 8030 of the frame of reference. The path of FIG. 3C, includes the coordinates in order: (0,8), (1,9), (2,9), (2,8), (2,7), (3,6), (4,5), (5,4), (6,3), and (7,2). These coordinates are stored in the data fields having positions 0 through 9 respectively in the data set used as the authentication factor based on the path in FIG. 3C.

FIG. 3D illustrates a path represented by arrows 8041, 8042 on an instance 8040 of the frame of reference. The path of FIG. 3D includes the coordinates in order: (0,5), (1,6), (2,7), (3,8), (4,9), (5,9), (6,8), (7,7), (8,6), and (9,5). These coordinates are stored in the data fields having positions 0 through 9 respectively in the data set used as the authentication factor based on the path in FIG. 3D.

FIG. 3E illustrates a path represented by arrows 8051, 8052 on an instance 8050 of the frame of reference. The path of FIG. 3E, includes the coordinates in order: (9,9), (9,8), (9,7), (9,6), (9,5), (8,5), (7,5), (6,5), (5,5), and (4,5). These coordinates are stored in the data fields having positions 0 through 9 respectively in the data set used as the authentication factor based on the path in FIG. 3E.

FIG. 3F illustrates a path represented by arrows 8061, 8062, 8063, 8064, 8065 on an instance 8060 of the frame of reference. The path of FIG. 3F, includes the coordinates in order: (2,9), (2,8), (3,8), (3,9), (4,9), (4,8), (5,8), (5,9), (6,9), and (6,8). These coordinates are stored in the data fields having positions 0 through 9 respectively in the data set used as the authentication factor based on the path in FIG. 3F.

The digitized paths shown in FIGS. 3B through 3F are considered herein continuous digitized paths, because all of the coordinates on the path are adjacent to other coordinates on the path in order. Continuous paths may be easier to remember for some clients.

Also, all of the representative digitized paths have the same number of points. Using the same number of points on each path facilitates the execution of the RPDPR authentication algorithm, but is not necessary to the concept of the RPDPR authentication factor from client to client.

Other embodiments of the invention use digitized paths that are non-continuous, such as described of reference to FIGS. 4A–4F.

Figure 4A:
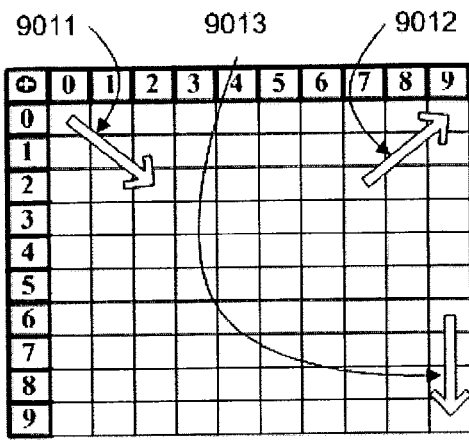
FIGS. 4A–4F provide various examples of full non-continuous paths having ten positions for online user account set up in support of the RPDPR authentication process during the login sessions according to the present invention.

FIG. 4A illustrates a non-continuous path represented by arrows 9011, 9012, 9013 on an instance 9010 of the frame of reference. The path of FIG. 4A, includes the coordinates in order: (0,0), (1,1), (2,2), (7,2), (8,1), (9,0), (9,6), (9,7), (9,8), and (9,9). A discontinuity in the path occurs between the coordinates (2, 2) and (7, 2). Also, a discontinuity occurs between the coordinates (9, 0) and (9, 6). These coordinates are stored in the data fields having positions 0 through 9 respectively in the data set used as the authentication factor based on the path in FIG. 4A.

Figure 4B:
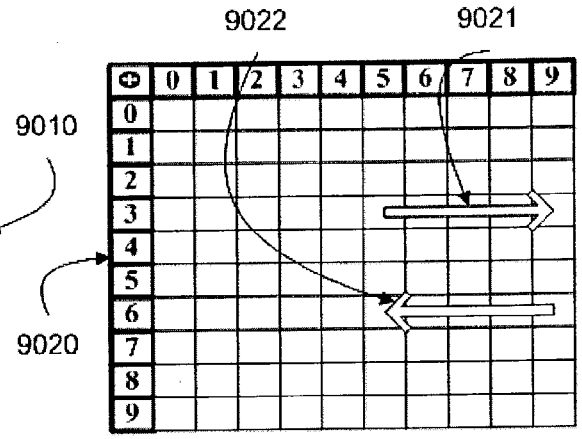

FIG. 4B illustrates a non-continuous path represented by arrows 9021, 9022 on an instance 9020 of the frame of reference. The path of FIG. 4B, includes the coordinates in order: (5, 3), (6, 3), (7, 3), (8, 3), (9, 3), (9, 6), (8, 6), (7, 6), (6, 6), and (5, 6). These coordinates are stored in the data fields having positions 0 through 9 respectively in the data set used as the authentication factor based on the path in FIG. 4B.

Figure 4C:
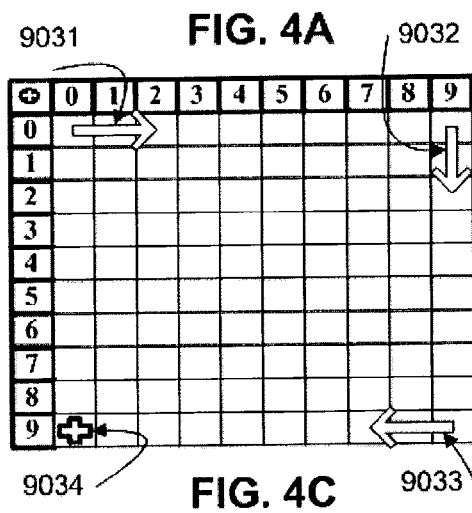

FIG. 4C illustrates a non-continuous path represented by arrows 9031, 9032, 9033 and cross 9034 on an instance 9030 of the frame of reference. The path of FIG. 4C, includes the coordinates in order: (0, 0), (1, 0), (2, 0), (9, 0), (9, 1), (9, 2), (9, 9), (8, 9), (7, 9), and (0, 9). These coordinates are stored in the data fields having positions 0 through 9 respectively in the data set used as the authentication factor based on the path in FIG. 4C.

Figure 4D:
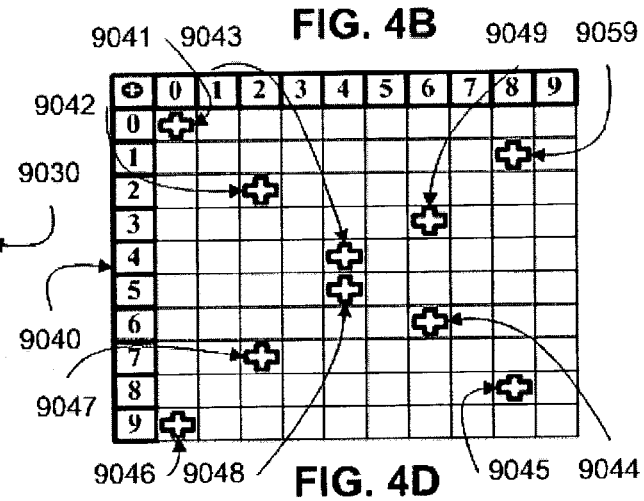

FIG. 4D illustrates a non-continuous path represented by crosses 9041, 9042, 9043, 9044, 9045, 9046, 9047, 9048, 9049, 9059 on an instance 9040 of the frame of reference.

The path of FIG. 4D, includes the coordinates in order: (0, 0), (2, 2), (4, 4), (6, 6), (8, 8), (0, 9), (2, 7), (4, 5), (6, 3), and (8, 1). These coordinates are stored in the data fields having positions 0 through 9 respectively in the data set used as the authentication factor based on the path in FIG. 4D.

Figure 4E:
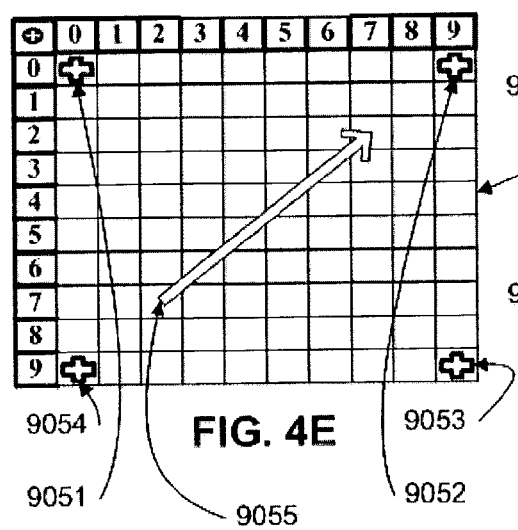

FIG. 4E illustrates a non-continuous path represented by crosses 9051, 9052, 9053, 9054 and arrow 9055 on an instance 9050 of the frame of reference. The path of FIG. 4E, includes the coordinates in order: (0, 0), (9, 0), (9, 9), (0, 9), (2, 7), (3, 6), (4, 5), (5, 4), (6, 3), and (7, 2). These coordinates are stored in the data fields having positions 0 through 9 respectively in the data set used as the authentication factor based on the path in FIG. 4E.

Figure 4F:
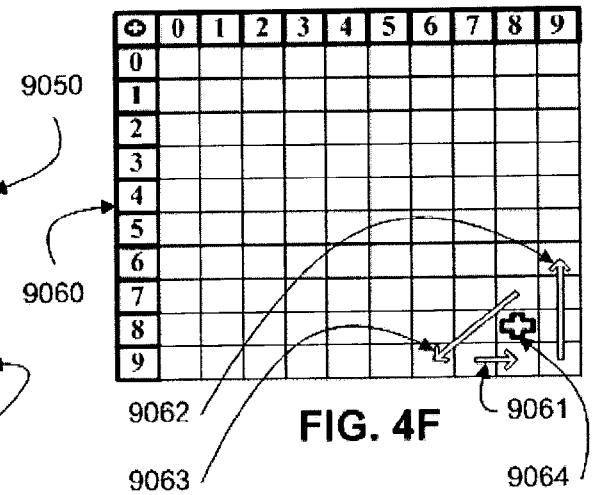

FIG. 4F illustrates a non-continuous path represented by arrows 9061, 9062, 9063 and cross 9064 on an instance 9060 of the frame of reference. The path of FIG. 4F, includes the coordinates in order: (7, 9), (8, 9), (9, 9), (9, 8), (9, 7), (9, 6), (8, 7), (7, 8), (6, 9), and (8, 8). These coordinates are stored in the data fields having positions 0 through 9 respectively in the data set used as the authentication factor based on the path in FIG. 4F.

Figure 5:
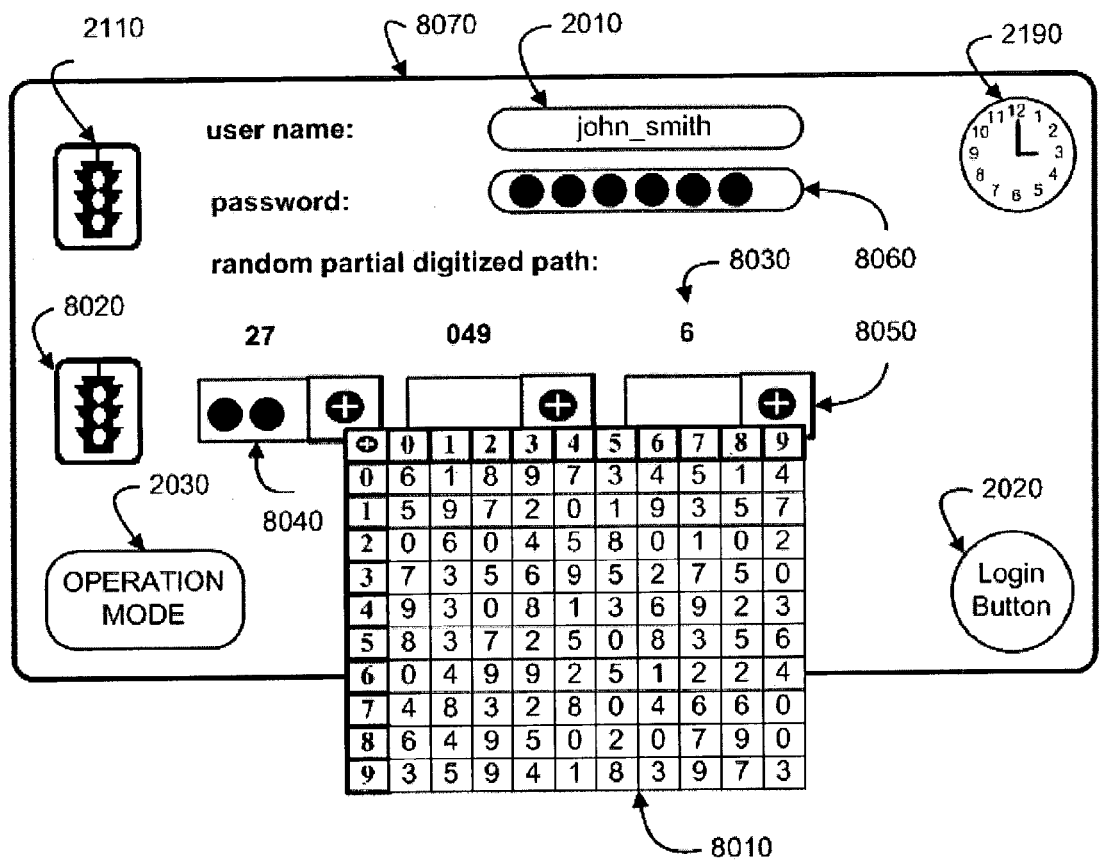
FIG. 5 illustrates a graphical user interface supporting a log-in process at the random partial path data entry state used in one example of an authentication program according to the present invention.

FIG. 5 illustrates a graphical user interface screen 2090, which is presented at the beginning of an authentication session based on RPDPR. After the user name in field 2010 is recognized by the server, the interface 2090 prompts the client for fulfillment of the RPDPR authentication factor. Otherwise, if the user name is not accepted by the authentication server, a "random partial digitized path" prompt and its respective fields (8040, 8050), field indicators 8030, and the second stop light icon 8020 do not appear in screen 2090, while the first stop light icon 2110 will turn red signaling access denied (or user name is incorrect). In this example, two stoplight icons 2110, 8020 are presented. The first stoplight icon 2110 turns green after the user static user name has been recognized. The second stoplight icon 8020 appears during data entry for the random partial subset. It appears red before data has been entered into data fields, or before the login button is indicated. The stoplight icon 8020 appears yellow during client/server communications and before acceptance of the input data representing field contents. The stoplight icon 8020 appears green to signal successful authentication.

The entered and accepted user name could be displayed in the user name field 2010, either as usual text or as sequence of echo dots for security reasons. Data entry fields (e.g. 8040) are presented for a pattern comprising a corresponding number of fields which will constitute the random partial subset of the data set of data fields stored for the user. In this example, a plurality of the random partial subsets are presented to the user by sets of field position numbers (e.g. 8030), and includes set of field position numbers 27 (position 2 and position 7), set of field position numbers 049, field position number 6, out of a data set of for example 10 data fields corresponding to a digitized path comprising 10 points. In this embodiment, associated with each of the data entry fields is a button 8050 with a corresponding window for entry of indicators selected by the user. By indicating a button 8050, a pop-down menu 8010 is displayed. The pop-down menu 8010 comprises an instance of a reference grid, such as shown in FIGS. 9A–9F and 10A–10F, where the points on the grid are populated by a randomized array of indicators. Thus, an indicator at the point having coordinates (4, 5) is the digit 5. The server produces a different instance of the array of indicators for each instance of the reference grid. The different instances of the array of indicators can be generated randomly, or pseudo-randomly, in preferred embodiments. Alternatively, a set of previously generated arrays of indicators can be utilized in a random order. In some embodiments, the look and feel of the reference grid is maintained from session to session, while the array of indicators is changed. In other embodiments, the reference grid may take different forms, so long as the coordinates of the points on the digitized path may be used to identify positions on the form of the reference grid. Other techniques can be utilized for making the presentation of the reference grid and the arrays of indicators variable to strengthen the authentication factor.

The graphical user interface 2090 presents clues represented by the sets the field position numbers (e.g. 8030). Corresponding input fields 8040 are presented to the user. The user fulfills the authentication factor by including the indicators from the points on the reference grid having the coordinates that correspond to the field position numbers in the sets the field position numbers that identify the random partial subset of the full path, associated as clues with the input fields. Thus, in the input fields corresponding to the set of field position numbers 27, for a full digitized path as shown in FIG. 3B, the indicators chosen will be the indicator at the coordinates stored in field position number 2 and at the coordinates stored in field position number 7 of the full data set. Field position number 2 in the example of FIG. 3B stores the coordinates (7, 7). The indicator at the coordinates (7, 7) is the digit 6. The field position number 7 in the example of FIG. 3B stores the coordinates (2, 7). The indicator at the coordinates (2, 7) is the digit 3. Therefore, the input field 8040 is fulfilled by inputting the indicators 6 and 3. A similar procedure is followed to fulfill the fields corresponding to the clues that consist of the sets the field position numbers 049 and 6 for the interface 8070 shown in FIG. 5.

Figure 6:
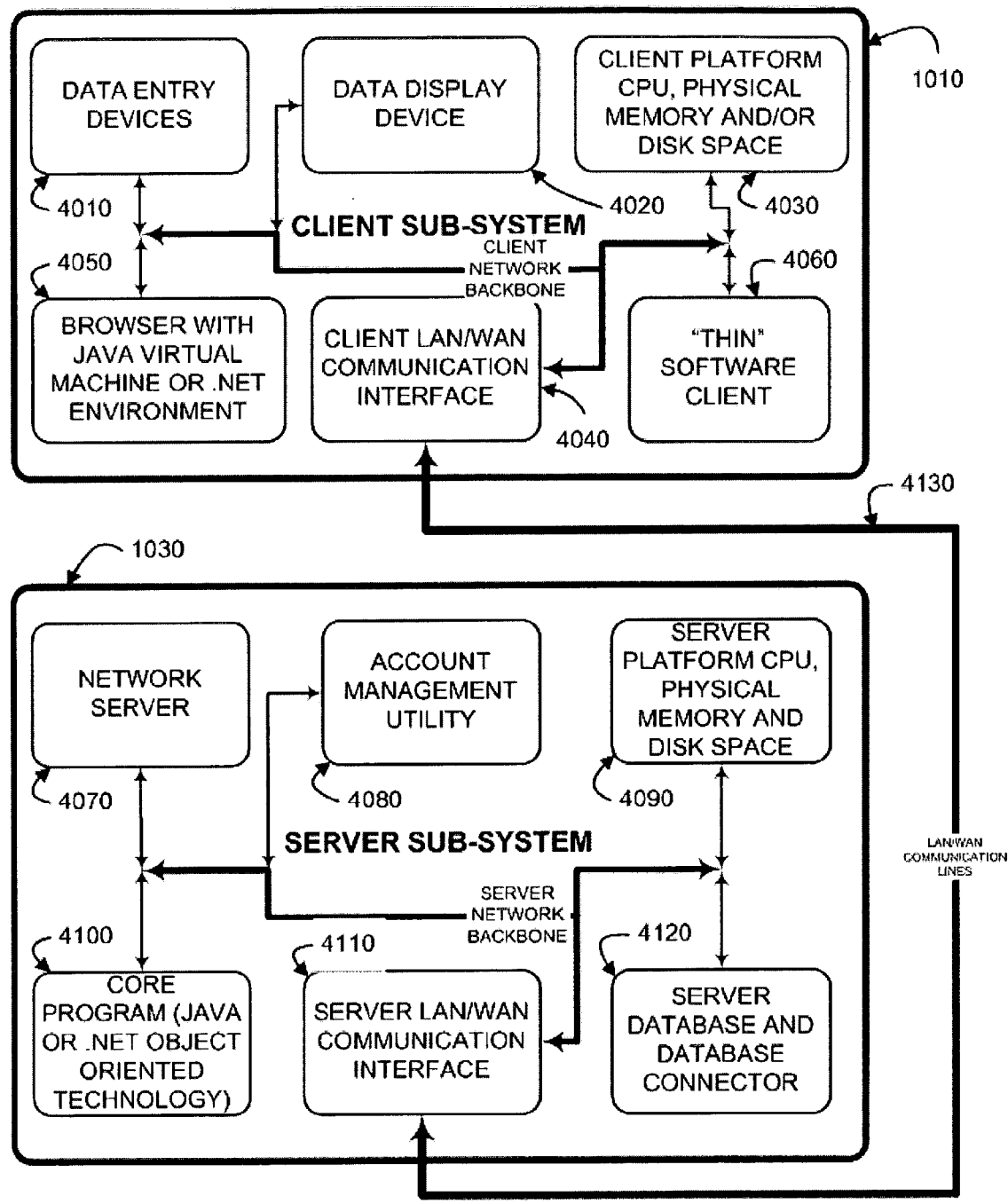
FIG. 6 is a basic architecture diagram for an embodiment of a client/server system according to the present invention, including support for the RPDPR authentication processes.

FIG. 6 illustrates a client/server system including authentication resources according to the RPDPR authentication factor of the present invention. The client subsystem 1010 includes data entry devices 4010 (keyboard, mouse, voice input, etc.), a display device 4020 (CRT, LCD panel, etc.), and a physical platform 4030 (personal computer, hand held computer, internet appliance, etc.) including a processing unit, memory, and other data processing resources. Software running in the client includes a browser 4050 or a "thin" software client 4060 such as may be provided on personal digital assistants, cell phones, and other simple internet appliances which may not support full browser functionality. The browser 4050 includes Java Virtual Machine or a .NET environment which supports the client/server dialog. Likewise, the "thin" software client 4060 may support the client/server dialog. Finally, an interface 4040 to the network communication media 4130 is provided. The communication media 4130 may be a private or pubic, local area network or a wide area network using wired, wireless or optical media in representative systems.

The server subsystem 1030 includes network server resources 4070, an account management utility 4080 for the user accounts subject of the authentication process, and a platform 4090 including a processing unit, memory, disk space and other data processing resources. A core program 4100 supporting the authentication process is included in the server subsystem 1030. The core program may be implemented using Java or .NET object-oriented technology for examples. Also, a server database and database connector 4120 is included. Finally, an interface 4110 to communication media for server LAN/WAN communication lines 4130 is provided. In some embodiments, the server and server data are implemented with security features to protect user account information files from intruders.

In various embodiments, the present system is used for user authentication in a client/server network architecture, for authentication of hardware devices (where the clients comprise peer routers for example) and in other environments supporting interactive authentication sessions. Interactive authentication based on the Random Partial Digitized Path Recognition (RPDPR) algorithm provides significant security protection against multiple known intruder attacks. The interactive, multi-field pattern process of the present invention establishes a new paradigm, replacing or enhancing standard static password technology. By capitalizing on modem high clock rate client/server CPU processing power and high network throughput, the RPDPR authentication process is easy to use.

In the examples described above, user authentication begins with a client's initial request to a protected network destination. Then, the server, having known the client's user name and the shared secret full pattern (full digitized path of data fields with their positions, and respectively coordinates characterizing these positions, ordered according to their positions along the path), prompts the client through the client's GUI to fulfill a subset of the user's full pattern randomly selected by the server. The full pattern is a pre-set shared secret between the client and the server established during the client account set-up. The full pattern resides in the database on the server side. Each field in the random subset requested from the client is associated with a displayed sequence number corresponding to a position in the full pattern. Each field in the GUI allows entering any combination of objects (at least one object per field is to be entered). In the example presented for RPDPR, the objects entered in the field may be selected from a randomized set of indicators on a representation of the reference grid, that are located at the coordinates stored in the subset of the data set storing the full digitized path. Upon receiving the client's response, the server compares internally computed expected combination with the client's input data, and makes a no/go authentication decision, provided the response is false/true.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An interactive method for authentication of a client, comprising:
   storing data defining a graphical representation of a frame of reference adapted for rendering on a display, the frame of reference including pre-defined locations in the frame of reference having coordinates on the frame of reference;
   storing a data set in a memory, the data set including a plurality of data fields having respective positions in said data set and having field contents identifying a plurality of said pre-defined locations having an order with coordinates along a digitized directional path known to the client on the frame of reference;
   identifying to the client via a data communication medium, positions of a random partial subset of data fields in said data set;
   accepting input data from the client via a data communication medium, corresponding to coordinates on the frame of reference of a partial subset of said plurality of pre-defined locations along said digitized path, the partial subset of said plurality of pre-defined locations being identified by the positions of the data fields in the random partial subset of said data set; and
   determining whether the input data matches the pre-defined locations identified by the field contents of data fields in the random partial subset, and if the input data matches, signaling successful authentication, and if the input data does not match, signaling failed authentication.

2. The method of claim 1, including presenting an instance of said graphical representation of the frame of reference, including an array of indicators at said pre-defined locations on the frame of reference, and wherein said input data includes said indicators.

3. The method of claim 1, including presenting an instance of said graphical representation of the frame of reference, including an array of indicators at said pre-defined locations on the frame of reference, and wherein said input data includes said indicators, wherein said indicators comprise alphanumeric characters.

4. The method of claim 1, including presenting an instance of said graphical representation of the frame of reference, including an array of indicators at said pre-defined locations on the frame of reference, and said input data includes said indicators, wherein said indicators are randomly or pseudo-randomly generated by a server so that the instance presented uses different indicators in said pre-defined locations than are used in other instances of the graphical representation.

5. The method of claim 1, including presenting to the client from a server via a data communication medium, an input construct for entry of data corresponding to field contents of said random partial subset of data fields from the data set, and wherein said accepting input data from the client includes accepting data based on said input construct.

6. The method of claim 1, including presenting to the client from a server via a data communication medium, a graphical user interface including an input construct facilitating input of data corresponding to said positions by the client wherein said input construct comprises an instance of a graphical representation of said frame of reference having an array of indicators said pre-defined locations on the frame of reference, and input fields for inserting indicators from said array of indicators corresponding to said random partial subset.

7. The method of claim 1, including presenting to the client an input construct for account set up, and accepting data from the client based on the input construct, to set field contents for the data fields in the data set.

8. The method of claim 1, including presenting to the client an input construct for account set up, and accepting data from the client based on the input construct, to set field contents for the data fields in the data set, wherein the input construct includes a graphical representation of said frame of reference.

9. The method of claim 1, wherein said digitized path on the frame of reference includes a first set of said pre-defined locations, and a sequence of additional sets of said pre-defined locations in said order, and wherein the field contents of data fields in said data set respectively identify the first set of said pre-defined locations and the additional sets of said pre-defined locations, and the positions of data fields in said data set correspond to said order.

10. The method of claim 1, wherein said digitized path includes a first set of said pre-defined locations, and a sequence of additional sets of said pre-defined locations in said order, wherein said first set of said pre-defined locations and said sequence of additional sets of said pre-defined locations consist of a continuous digitized path on said frame of reference.

11. The method of claim 1, wherein said digitized path includes a first set of said pre-defined locations, and a sequence of additional sets of pre-defined locations in said order, wherein said first set of said pre-defined locations and said sequence of additional sets of said pre-defined locations consist of a non-continuous digitized path on said frame of reference.

12. The method of claim 1, wherein said digitized path on the frame of reference has a predetermined number of sets of said pre-defined locations, and includes a first set of said pre-defined locations, and a sequence of additional sets of said pre-defined locations in said order set by the client to define the full digitized path.

13. The method of claim 1, including selecting instances of said random partial subset at a server, wherein said instances include a variable number of positions of data fields in said data set.

14. The method of claim 1, including identifying positions of data fields for a plurality of random partial subsets of said data set.

15. The method of claim 1, including providing a session timer, and including disabling a client session if an elapsed time exceeds a threshold before an authentication event in a client session.

16. The method of claim 1, including:
displaying an icon during said identifying, accepting and determining, said icon having a first state during said identifying, a second state after said accepting, and a third state after said determining.

17. The method of claim 1, including:
displaying a stop light icon during said identifying, accepting and determining, said icon displaying a red light during said identifying, displaying a yellow light after said accepting, and displaying a green light after said determining.

18. The method of claim 1, wherein said client provides input data in a client system coupled to communication media.

19. The method of claim 1, wherein said client provides input data in a client system, including a browser coupled to communication media.

20. The method of claim 1, including:
detecting an attempt to access a network resource by the user;
presenting, in response to the detected attempt to access a protected network resource, an interface to the client via a data communication medium, the interface supporting said indicating and said accepting; and
if the input data matches, signaling authentication of the client.

21. The method of claim 20, wherein said interface includes an instance of a graphical representation of the frame of reference, including an array of indicators at said pre-defined locations in the frame of reference, and said input data includes said indicators.

22. An authentication system for a client, comprising:
data processing resources, including a processor, memory and a communication interface;
data stored in said memory defining a graphical representation of a frame of reference adapted for rendering on a display, the frame of reference including pre-defined locations in the frame of reference having coordinates on the frame of reference;
user account information stored in said memory, including for respective clients a data set including a plurality of data fields having respective positions in said data set and having field contents a plurality of said pre-defined locations having an order with coordinates along a digitized directional path known to the client on the frame of reference;
an authentication server adapted for execution by the data processing resources, including logic to identify to the client via the communication interface, positions in said data set of a random partial subset of data fields from said data set, logic to accept input data from the client via the communication interface, corresponding to coordinates on the frame of reference of a partial subset of said plurality of pre-defined locations, the partial subset of said plurality of pre-defined locations being identified by the positions of the data fields in the random partial subset, and logic to determine whether the input data matches the field contents of corresponding data fields in the random partial subset wherein the authentication server includes logic which if the input data matches, signals successful authentication, and if the input data does not match, signal failed authentication.

23. The system of claim 22, wherein the authentication server includes logic to present an instance of said graphical representation of the frame of reference, including an array of indicators at said pre-defined locations on the frame of reference, and said input data includes said indicators.

24. The system of claim 22, wherein the authentication server includes logic to present an instance of said graphical representation of the frame of reference, including an array of indicators at said pre-defined locations on the frame of reference, and said input data includes said indicators, wherein said indicators comprise alphanumeric characters.

25. The system of claim 22, wherein the authentication server includes logic to present an instance of said graphical representation of the frame of reference, including an array of indicators at said pre-defined locations on the frame of reference, and said input data includes said indicators, and logic to randomly or pseudo-randomly generate said array of indicators so that the instance presented uses different indicators than are used in other instances of the graphical representation.

26. The system of claim 22, wherein the authentication server includes logic to present said graphical user interface including an input construct facilitating input of data corresponding to said data field positions by the client, wherein said input construct comprises an instance of said frame of reference having an array of indicators at said pre-defined locations on the frame of reference, and input fields for inserting indicators from said array of indicators corresponding to said random partial subset.

27. The system of claim 22, including logic to present to the client an input construct for account set up, and to accept data from the client based on the input construct, to set field contents for the data fields in said data set wherein the input construct includes an instance of a graphical representation of said frame of reference.

28. The system of claim 22, wherein said a full digitized path on the frame of reference includes a first set of said pre-defined locations, and a sequence of additional sets of said pre-defined locations in said order, and wherein the field contents of data fields in said data set respectively identify the first set of said pre-defined locations and the additional sets of said pre-defined locations, and the positions of data fields in said data set correspond to said order.

29. The system of claim 22, wherein said digitized path includes a first set of said pre-defined locations, and a sequence of additional sets of said pre-defined locations in said order, wherein said first set of said pre-defined locations and said sequence of additional sets of said pre-defined locations consist of a continuous digitized path on said frame of reference.

30. The system of claim 22, wherein said digitized pat includes a first set of said pre-defined locations, and a sequence of additional sets of said pre-defined locations in said order, wherein said first set of said pre-defined locations and said sequence of additional sets of said pre-defined locations consist of a non-continuous digitized path on said frame of reference.

31. The system of claim 22, wherein said full digitized path on the frame of reference characterized by a predetermined number of sets of said pre-defined locations and includes a first set of said pre-defined locations, and a sequence of additional sets of said pre-defined locations in said order set by the client to define the digitized path.

32. The system of claim 22, wherein the authentication server includes logic to generate instances of said random partial subset, wherein said instances include a variable number of positions of data fields in said data set.

33. The system of claim 22, wherein the authentication server includes logic to identify positions of data fields for a plurality of random partial subsets of said data set in a client session.

34. The system of claim 22, including logic to present to the client an input construct for account set up, and to accept data from the client based on the input construct, to set field contents for the data fields in the data set.

35. The system of claim 22, including logic to present to the client a graphical input construct for entry of field contents of said random subset of data fields.

36. The system of claim 22, including logic to provide a session timer, and logic to disable a client session if an elapsed time exceeds a threshold before an authentication event in client session.

37. The system of claim 22, wherein said authentication server includes logic to display an icon, said icon, having a first state during an initial stage of a client session, a second state after accepting input data, and a third state after determining whether the input data matches.

38. The system of claim 22, wherein said authentication server includes logic to display a stop light icon, said icon displaying a red light during an initial stage of a client session, displaying a yellow light after accepting input data, and displaying a green light after determining whether the input data matches.

39. An article storing computer programs supporting an authentication system for a client, comprising:
- a machine readable data storage medium storing data defining a graphical representation of a frame of reference adapted for rendering on a display, the frame of reference including pre-defined locations in the frame of reference having coordinates on the frame of reference;
- a machine readable data storage medium storing user account information, including for respective clients a data set including a plurality of data fields having respective positions in said data set and having field contents identifying a plurality of said pre-defined locations having an order with coordinates along a digitized directional path known to the client on the frame of reference, and
- a machine readable data storage medium storing computer programs executable by a data processor including logic to identify to the client via the communication interface, positions in said data set of a random partial subset of data fields from said data set, logic to accept input data from the client via the communication interface, corresponding to coordinates on the frame of reference of a partial subset of said plurality of pre-defined locations, the partial subset of said plurality of pre-defined locations being identified by the positions of the data fields in the random partial subset, and logic to determine whether the input data matches the field contents of corresponding data fields in the random partial subset, and if the input data matches, signaling successful authentication, and if the input does not match, signaling failed authentication.

* * * * *